Feb. 5, 1957 L. M. UPCHURCH 2,780,476
CARRIER FOR CONTAINERS
Filed March 3, 1955

Lewis M. Upchurch,
INVENTOR.

BY Eaton + Bell

ATTORNEYS

United States Patent Office 2,780,476
Patented Feb. 5, 1957

2,780,476

CARRIER FOR CONTAINERS

Lewis Marvin Upchurch, Raeford, N. C., assignor to Hoke Oil & Fertilizer Company, Raeford, N. C., a corporation of North Carolina Application March 3, 1955, Serial No. 491,855

7 Claims. (Cl. 280—47.24)

This invention relates to a carrier for containers and is especially adapted for carrying containers such as peach baskets, bean baskets and the like so the same can be filled while in transport position and can be carried to any desired location without the necessity of lifting the same time after time during the filling operation.

An object therefore of this invention is to provide a carrier for a container which will hold the container in upright position while it is being filled and which can be used for transporting the filled containers to any desired location.

It is another object of this invention to provide a carrier for a container which will firmly hold the container in elevated position while the fruit or vegetable picker fills the container, thus making it easier to fill the container.

Some of the objects of the invention having been stated, other objects will appear as the description proceeds, when taken in connection with the accompanying drawings, in which—

Figure 2:
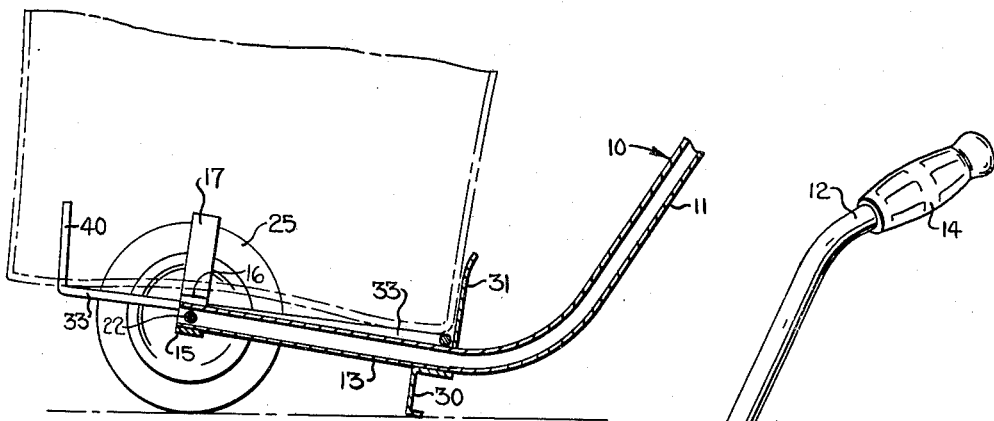
Figure 2 is a longitudinal sectional view taken along the line 2—2 in Figure 1 and showing a container such as a peach basket in dotted lines.

Referring more specifically to the drawings, the numeral 10 broadly indicates the carrier arm having a substantially straight inclined portion 11 terminating at the upper end in an outwardly and upwardly bent integral handle portion 12 on which is provided a hand grip 14 for pushing or pulling the carrier. The lower end of the straight portion 11 of the arm has an integral upwardly bent portion 13 which lies in a plane substantially horizontal to the ground when the carrier is in normal operating position.

The upwardly bent horizontal portion 13 serves as a supporting base for receiving a container carried by the carrier. The end of the horizontal portion 13 of the carrier arm 10 is received in a U-shaped portion 15 of an axle supporting member 16. The axle supporting member 16 terminates at each end in upwardly right angularly bent container retaining portions 17 and 18 respectively to the sides of which are fixedly secured upright flat strip members 20 and 21 respectively which extend downwardly below portions 17 and 18. Of course members 20 and 21 could be integral with 17 and 18 instead of being separate members fixedly secured thereto.

Figure 1:
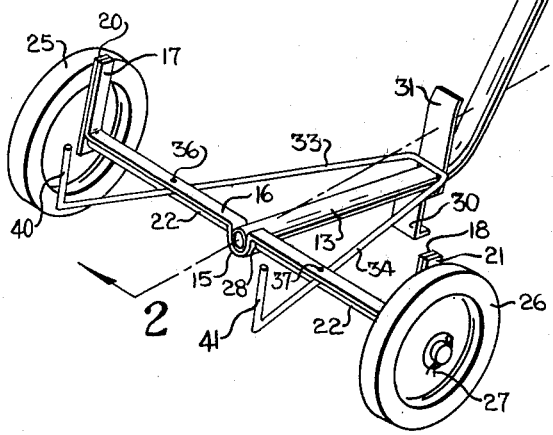
Figure 1 is an isometric view of the transporting mechanism.

It will be noticed in Figure 1 that strip members 20 and 21 extend downwardly below the plane of the axle supporting member 16 for a distance sufficient to support an axle 22 in spaced relation thereto. Apertures or bores are provided in the lower portions of the strip members 20 and 21, through which the axle 22 extends.

On the ends of the axle 22 are provided wheels 25 and 26 rotatably secured thereon by any suitable means such as cotter keys 27, only one of which is shown. It will be observed in Figure 2 that the upright members 20 and 21 not only support the axle 22 but act as guide members for the wheels 25 and 26.

The U-shaped portion 15 of the axle supporting member 16 is provided with opposed apertures 28 through which the axle 22 is received for supporting same in the mid-portion. The outer end of the horizontal portion 13 is also provided with opposed apertures in alinement with apertures 28 and is penetrated by the axle 22. The axle 22 thus serves to connect the arm 10 to the carrier.

Approximately at the point of the horizontal portion 13 joining the straight inclined portion 11 of the arm 10 is provided a depending rest 30 fixedly secured thereto which will insure the carrier and a container thereon being held substantially horizontally in the carrier. There is also fixedly secured to said arm at said point a retaining member 31 extending upwardly to hold a container in proper position.

At the junction of the horizontal portion 13 and the upright retainer 31 is secured a substantially U-shaped member having legs 33 and 34 which extend forwardly and are secured as by rivets or bolts 36 and 37 immediately adjacent the lower side of the supporting member 16 and immediately above the axle 22. The rivets or bolts 36 and 37 extend through the supporting member 16, legs 33, 34, and axle 22. It will thus be seen that the axle is secured against rotation.

The forward ends of the legs 33 and 34 have upright portions as at 40 and 41 to retain the front portions of the basket while the upright 31 supports the rear portion of the basket against longitudinal movement. The upright portions 17, 18, 31, 40, 41 as will be observed are arranged in spaced circular relationship to retain a container from sliding off the carrier.

It is thus seen that I have provided a container carrier into which the containers can easily be placed and transported and from which the containers can easily be removed when they are transported to the desired location.

In the drawings and specification there has been set forth a preferred embodiment of the invention and although specific terms are employed, they are used in a generic and descriptive sense only and not for purposes of limitation, the scope of the invention being defined in the claims.

I claim:

1. A carrier for containers and the like comprising a carrier arm having a substantially straight inclined portion terminating at the outer end in an upwardly and outwardly inclined handle portion and at the other end having a horizontal portion extending inwardly, a transversely disposed axle supporting member connected at its medial portion to said horizontal portion of said arm adjacent the forward end thereof, an axle carried by said axle supporting member, wheels rotatably mounted on the ends of said axle, a U-shaped member overlying said horizontal arm portion and having its medial portion secured to the rear portion thereof with its legs extending forwardly over and beyond said axle, upright portions defining the forward ends of said legs, and an upright portion secured to said horizontal portion of said arm adjacent the medial portion of said U-shaped member whereby a container positioned on the carrier will be prevented from sliding off in a forward or rearward direction.

2. A carrier as claimed in claim 1 wherein said axle supporting member has opposed upright portions on the ends for confining a container from sliding off the sides of the carrier and opposed depending portions for supporting said axle.

3. A carrier for containers and the like comprising a carrier arm having a substantially straight inclined portion terminating at the outer end in an upwardly and outwardly inclined handle portion and at the other end having a horizontal portion extending inwardly, a transversely disposed axle supporting member connected at its medial portion to said horizontal arm portion, an axle carried by said axle supporting member, wheels rotatably mounted on said axle, and a U-shaped member having its medial portion secured to the rear portion of said horizontal arm portion with the ends of the U-shaped member extending forwardly over and past said axle and terminating in spaced upright retaining portions.

4. A carrier as claimed in claim 3 wherein said axle supporting member has opposed upright retaining portions on the ends thereof, and a retaining upright member is secured to said horizontal arm portion adjacent the medial portion of said U-shaped member whereby a container placed on the carrier is prevent from sliding off.

5. A carrier as claimed in claim 4 wherein all said upright retaining portions are arranged in circular spaced relationship to completely confine the sides of a container placed on the carrier.

6. A carrier for containers and the like comprising an inclined arm member having a handle on its outermost end, a horizontal arm portion on the front end thereof, a transversely disposed support secured to said horizontal arm portion, said support having first uprights at each end thereof, depending members secured to said first uprights, an axle supported by said depending members with the medial portion of said axle penetrating said support and said horizontal arm portion and supported thereby, a substantially U-shaped member secured at its medial portion to said horizontal arm portion and having its legs extending forwardly therefrom over and beyond said axle in spaced relation, an upright secured to said horizontal arm portion adjacent the medial portion of said U-shaped member, the legs of the U-shaped member being bent upwardly at the outer ends to form additional uprights to prevent the container from sliding forwardly, and means securing the legs of said U-shaped member to said support.

7. A carrier for containers and the like comprising a carrier arm having a substantially straight inclined medial portion and having a horizontal portion at its lower end extending inwardly, a transversely disposed axle supporting member having a recessed medial portion for receiving the end of the horizontal arm portion, an axle penetrating the medial portion of said axle supporting member and the end of said horizontal arm portion for being carried by the same, wheels rotatably mounted on the ends of said axle, a U-shaped member having its medial portion secured to the rear portion of said horizontal arm portion and having its legs extending forwardly therefrom over and beyond said axle, upright portions defining the forward ends of the legs of said U-shaped member, and an upright portion secured to said horizontal arm portion adjacent the medial portion of said U-shaped member.

References Cited in the file of this patent

UNITED STATES PATENTS

| | | |
|---|---|---|
| 800,445 | Hourihan | Sept. 26, 1905 |
| 1,615,919 | Sheldon | Feb. 1, 1927 |
| 2,690,341 | Fujita | Sept. 28, 1954 |

FOREIGN PATENTS

| | | |
|---|---|---|
| 17,723 | Denmark | Aug. 25, 1913 |
| 644,108 | Great Britain | Oct. 4, 1950 |
| 76,395 | Norway | June 11, 1951 |